H. A. STONEHAM & C. T. SCHWARZE.
RESILIENT TIRE.
APPLICATION FILED JAN. 16, 1912.

1,043,642.

Patented Nov. 5, 1912.

WITNESSES
Edw. Thorpe
H. S. Orton.

INVENTORS
Horace A. Stoneham
Carl T. Schwarze
BY Munn & Co
ATTORNEYS

UNITED STATES PATENT OFFICE.

HORACE A. STONEHAM AND CARL T. SCHWARZE, OF SOUTH ORANGE, NEW JERSEY.

RESILIENT TIRE.

1,043,642.  Specification of Letters Patent.  Patented Nov. 5, 1912.

Application filed January 16, 1912. Serial No. 671,403.

*To all whom it may concern:*

Be it known that we, HORACE A. STONEHAM and CARL T. SCHWARZE, both citizens of the United States, and residents of South Orange, in the county of Essex and State of New Jersey, have invented a new and Improved Resilient Tire, of which the following is a full, clear, and exact description.

Our invention relates to a new and improved form of resilient tire for automobiles and other vehicles, and particularly relates to that type of resilient tires which are not intended to be inflated, and which are not only resilient but are also reliable and durable.

The objects of our invention are generally, the provision of a device of the above-mentioned class, which is inexpensive to manufacture, and, specifically, the provision of a resilient tire adapted to supersede pneumatic structures, and so constructed that although adapted to afford proper resiliency, it will yet give sufficient rigidity to the periphery of the wheel; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive features of the device, it being understood, that, within the scope of what hereinafter thus is claimed, divers changes in the form, proportions, size and minor details of the structure may be made, without departing from the spirit or sacrificing any of the advantages of the invention.

We attain the above-outlined objects by mounting within a recess within the periphery of the wheel, a series of independent transversely-disposed base plates, each of said base plates carrying an arched spring, a series of compression springs being disposed between each plate and its coacting arched spring. The several springs are united by peripherally disposed straps or tie bands and the resilient portions are inclosed within a suitable outer resilient tire.

Reference is to be had to the accompanying drawings, forming a part of this specification, in which similar characters of reference indicate corresponding parts in both the figures, and in which—

Figure 1:
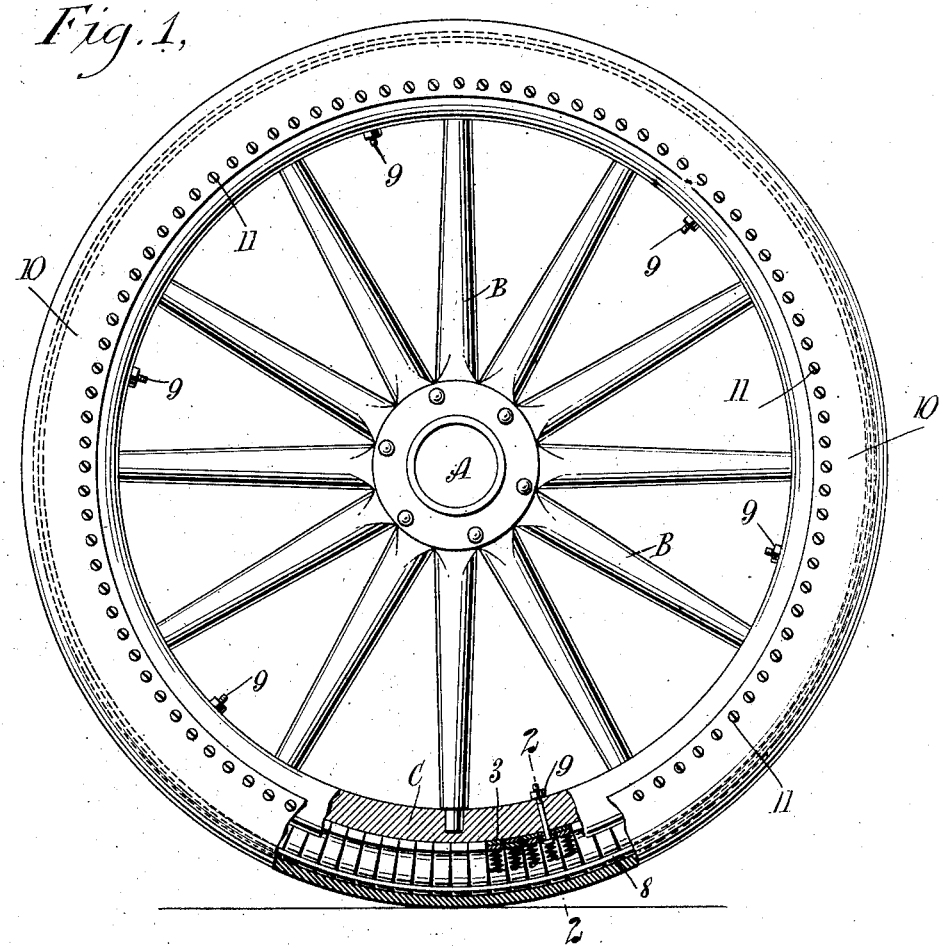
Figure 2:
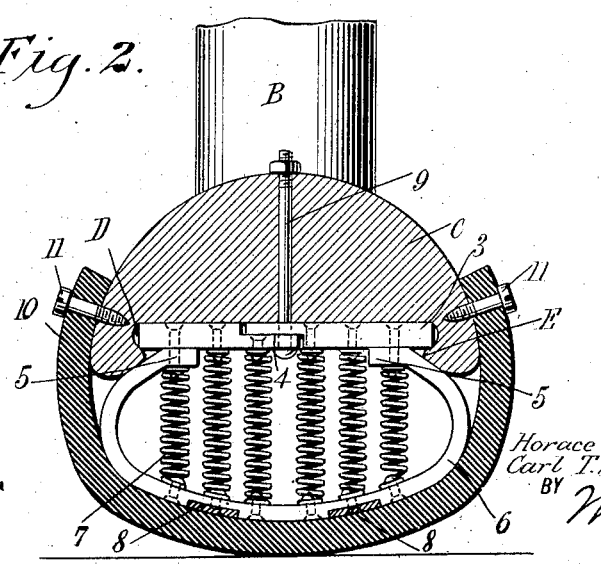

Figure 1 is a side elevation of a preferred embodiment of our invention, parts being broken away to show the internal mechanism, and Fig. 2 is a transverse sectional view taken on the line 2—2 of Fig. 1.

Described more in detail, we have shown a wheel of any suitable construction, having a hub portion A, spokes B and a felly C, said felly having a peripherally-disposed recess D of relatively great internal width, so as to form a pair of oppositely-disposed overhanging flanges E. Disposed within the recess and fitting within the flanges E, and extending transversely of the wheel, are a plurality of base plates 3, each of said base plates being independent of the other plates, and in the illustration shown to be of two parts with a central overlapping rabbeted joint 4, so as to permit the plates to be inserted beneath the flanges E.

Fastened to opposite ends of each of the base plates 3, are the free ends 5 of an arched spring 6, which arched spring is substantially in the form of an ellipse with its major axis extending across the tire and positioned exteriorly of the felly of the wheel. Disposed between the base plate 3 and the arched spring 6 and in the plane of the arched spring, is a series of independent compression springs 7, said series of springs being positioned transversely of the wheel and diametrically relative thereto. As many of these springs may be provided as are found necessary; in this instance six springs being shown to each base plate and arched spring. All of the arched springs are resiliently fastened together by means of peripherally disposed resilient bands 8, in the illustration shown to be two in number and disposed on opposite sides of the center of the periphery of the wheel.

In order to prevent creeping of the resilient members about the felly of the wheel, a series of spaced-apart bolts 9 are provided, which bolts 9 extend through the felly and engage one of the base plates 3. The wheel may run on the connected arched springs 6, but preferably, some suitable form of covering or tire 10, of leather, rubber or other suitable material, houses the resilient parts of the wheel, and has its opposite edges removably affixed to the felly by means of screws 11.

Having thus described our invention, we claim as new and desire to secure by Letters Patent:

In combination with a wheel rim having lateral inwardly extending side flanges, a tire comprising a series of separate resilient units each consisting of a transversely arched spring having inwardly turned spaced ends at the base, a base plate composed of two members each of which is carried by one of the inturned base ends of the arched spring, and secured thereto near its outer end, the projecting portions of said member engaging under the flanges of the rim, the inner ends of the said member of the base plate being rabbeted, means for securing certain of the base plates to the wheel rim to prevent the creeping of the tire, a transverse series of compression springs secured at their outer ends to the arched spring, the outermost of said compression springs being seated upon and secured to the inturned base ends of the arched spring, and the others of said transverse compression springs being seated upon and secured to the members of the mentioned base plate.

In testimony whereof we have signed our names to this specification in the presence of two subscribing witnesses.

HORACE A. STONEHAM.
CARL T. SCHWARZE.

Witnesses:
MYRON UPHAM,
JOSEPH M. ALEXANDER.

Copies of this patent may be obtained for five cents each, by addressing the "Commissioner of Patents, Washington, D. C."